United States Patent
Ishida et al.

(10) Patent No.: US 10,931,981 B2
(45) Date of Patent: Feb. 23, 2021

(54) VIDEO SERVER, VIDEO SERVER SYSTEM, AND COMMAND PROCESSING METHOD

(71) Applicant: SONY CORPORATION, Tokyo (JP)

(72) Inventors: Takafumi Ishida, Kanagawa (JP); Shinji Komatsuda, Kanagawa (JP); Chiharu Sakai, Kanagawa (JP); Takeaki Matsumoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/563,678

(22) PCT Filed: Mar. 29, 2016

(86) PCT No.: PCT/JP2016/001814
§ 371 (c)(1),
(2) Date: Oct. 2, 2017

(87) PCT Pub. No.: WO2016/163100
PCT Pub. Date: Oct. 13, 2016

(65) Prior Publication Data
US 2018/0077432 A1 Mar. 15, 2018

(30) Foreign Application Priority Data
Apr. 10, 2015 (JP) .............................. JP2015-080782

(51) Int. Cl.
*H04N 21/226* (2011.01)
*H04N 21/258* (2011.01)
(Continued)

(52) U.S. Cl.
CPC ..... *H04N 21/226* (2013.01); *H04L 29/06183* (2013.01); *H04L 65/4076* (2013.01);
(Continued)

(58) Field of Classification Search
CPC .......... H04L 29/06183; H04L 65/4076; H04L 65/605; H04N 21/226; H04N 21/25891; H04N 21/274; H04N 5/765
See application file for complete search history.

(56) References Cited

U.S. PATENT DOCUMENTS 5,522,070 A * 5/1996 Sumimoto ............ G06F 9/4881
709/226
5,883,621 A * 3/1999 Iwamura ........... H04L 12/40078
348/E5.103
(Continued)

FOREIGN PATENT DOCUMENTS

EP           1262063 B1 * 11/2007   ............. H04N 5/222
JP       2000-293976 A    10/2000
(Continued)

OTHER PUBLICATIONS

International Search Report and Written Opinion of PCT Application No. PCT/JP2016/001814, dated May 24, 2016, 08 pages of ISRWO.

*Primary Examiner* — Rong Le
(74) *Attorney, Agent, or Firm* — Chip Law Group

(57) ABSTRACT

A video server includes a plurality of ports used for inputting and outputting material data items, a storage unit capable of storing group information about grouping of the plurality of ports, and a control unit that receives a command of designating a specific port of the plurality of ports for inputting and outputting one of a plurality of specific material data items and the other of the plurality of specific material data items as a first port, determines one or more other ports belonging to the same group of the first port as one or more second ports on the basis of the group information, and executes the command so as to synchronize the plurality of material data items each other using the first port and the one or more second ports.

10 Claims, 13 Drawing Sheets

(51) Int. Cl.
*H04N 21/274* (2011.01)
*H04L 29/06* (2006.01)
*H04N 5/765* (2006.01)

(52) U.S. Cl.
CPC .......... *H04L 65/605* (2013.01); *H04N 5/765* (2013.01); *H04N 21/25891* (2013.01); *H04N 21/274* (2013.01)

(56) References Cited

U.S. PATENT DOCUMENTS

| | | | | |
|---|---|---|---|---|
| 6,037,939 | A * | 3/2000 | Kashiwagi | G06F 3/038 715/767 |
| 6,452,612 | B1 * | 9/2002 | Holtz | G06F 3/1431 348/722 |
| 6,909,874 | B2 * | 6/2005 | Holtz | G09B 7/02 434/322 |
| 6,952,221 | B1 * | 10/2005 | Holtz | G11B 27/034 715/719 |
| 6,985,671 | B2 * | 1/2006 | Mushiage | G06F 11/327 348/E5.008 |
| 7,024,677 | B1 * | 4/2006 | Snyder | G11B 27/031 715/723 |
| 7,116,890 | B2 * | 10/2006 | Yoshimoto | H04N 21/2182 386/264 |
| 7,221,848 | B2 * | 5/2007 | Kodama | G06F 11/1076 348/E5.008 |
| 7,302,644 | B2 * | 11/2007 | Holtz | G06F 3/1431 715/717 |
| 7,421,187 | B2 * | 9/2008 | Mushiage | G06F 11/327 348/E5.008 |
| 7,483,421 | B2 * | 1/2009 | Compton | H04L 45/00 370/352 |
| 7,688,478 | B2 * | 3/2010 | Hata | H04N 5/265 348/578 |
| 7,808,932 | B2 * | 10/2010 | Chen | H04L 12/185 370/270 |
| 7,844,690 | B1 * | 11/2010 | Durham | H04L 69/18 709/220 |
| 8,135,001 | B1 * | 3/2012 | Barreiro | H04L 65/4061 370/352 |
| 8,286,210 | B2 * | 10/2012 | Boyden | G09G 5/006 710/1 |
| 8,560,951 | B1 * | 10/2013 | Snyder | G11B 27/034 715/720 |
| 8,639,783 | B1 * | 1/2014 | Bakke | H04L 49/70 709/220 |
| 8,677,404 | B2 * | 3/2014 | Quinney | G09G 5/003 725/38 |
| 8,697,976 | B2 * | 4/2014 | Maruyama | G10H 1/0091 84/615 |
| 8,736,769 | B2 * | 5/2014 | McRae | H04N 5/4401 348/552 |
| 9,318,149 | B2 * | 4/2016 | Griggs | H04H 60/06 |
| 9,564,981 | B2 * | 2/2017 | Fujita | H04H 60/04 |
| 9,942,291 | B2 * | 4/2018 | Chen | H04L 65/4076 |
| 2002/0054758 | A1 | 5/2002 | Mushiage | |
| 2003/0086686 | A1 * | 5/2003 | Matsui | G11B 27/034 386/281 |
| 2003/0091329 | A1 * | 5/2003 | Nakata | G11B 27/034 386/281 |
| 2004/0070690 | A1 * | 4/2004 | Holtz | G11B 27/031 348/581 |
| 2004/0255329 | A1 * | 12/2004 | Compton | H04N 21/234327 725/109 |
| 2006/0008246 | A1 | 1/2006 | Mushiage | |
| 2006/0146184 | A1 * | 7/2006 | Gillard | H04L 47/10 348/398.1 |
| 2007/0283286 | A1 * | 12/2007 | Ashok | H04L 12/40032 715/764 |
| 2009/0187826 | A1 * | 7/2009 | Heimbold | H04N 5/262 715/719 |
| 2011/0292206 | A1 * | 12/2011 | Newton | H04L 12/4641 348/143 |

FOREIGN PATENT DOCUMENTS

| | | |
|---|---|---|
| JP | 2000-306367 A | 11/2000 |
| JP | 2001-203935 A | 7/2001 |
| JP | 2003-009063 A | 1/2003 |
| JP | 2003-153207 A | 5/2003 |
| JP | 2006-301748 A | 11/2006 |
| JP | 2009-146506 A | 7/2009 |
| JP | 2010-166337 A | 7/2010 |

\* cited by examiner

| Board Setting | Step 1. System Frequency | > Step 2. Port Type | > Step 3. Port Codec | > Step 4. Port Configuration | > Step 5. Remote | > Step 6. Serial Form |

○ 23.98Hz    ○ 24Hz    ○ 25Hz    ● 29.97Hz

Back    Next    Cancel

FIG.6

Select a Combination of Port Type

|  | ○ 4-IN | ○ 3-IN 1-OUT | ○ 2-IN 2-OUT | ○ 1-IN 3-OUT | ○ 4-OUT |
|---|---|---|---|---|---|
| Port A | Input | Input | Input | Input | Output |
| Port B | Input | Input | Output | Output | Output |
| Port C | Input | Input | Input | Output | Output |
| Port D | Input | Output | Output | Output | Output |

|  | ● 6-IN 2-OUT | ○ 5-IN 2-OUT | ○ 4-IN 2-OUT | ○ 3-IN 2-OUT |
|---|---|---|---|---|
| Port A | HD Multi-Input | Input | Input | Input |
| Port B | HD Multi-Input | HD Multi-Input | Input | Input |
| Port C | HD Multi-Input | HD Multi-Input | HD Multi-Input | Input |
| Port D | HD Multi-Output | HD Multi-Output | HD Multi-Output | HD Multi-Output |

|  | ○ 6-IN 1-OUT | ○ 4-IN 2-OUT | ○ 2-IN 3-OUT |
|---|---|---|---|
| Port A | HD Multi-Input | HD Multi-Input | HD Multi-Input |
| Port B | HD Multi-Input | Output | Output |
| Port C | HD Multi-Input | HD Multi-Input | Output |
| Port D | Output | Output | Output |

|  | ○ 3-IN 2-OUT | ○ 3-IN 1-OUT | ○ 2-IN 2-OUT | ○ 2-IN 1-OUT | ○ 1-IN 2-OUT |
|---|---|---|---|---|---|
| Port A | Input with 2 Boards | Input with 2 Boards | Input with 2 Boards | Input with 2 Boards | Input with 2 Boards |
| Port C | HD Multi-Input | HD Multi-Input | Input | Input | Output |
| Port D | HD Multi-Output | Output | HD Multi-Output | Output | Output |

|  | ○ 3-IN 1-OUT |  | ○ 2-IN 1-OUT |
|---|---|---|---|
| Port A | Input | Port A | Input with 2 Boards |
| Port B | Input |  |  |
| Port C | Input | Port C | Input |
| Port D | HD Cut Out | Port D | HD Cut Out |

Back | Next | Cancel

FIG.7

| Board Setting | Step 1. System Frequency > Step 2. Port Type > Step 3. Port Codec > Step 4. Port Configuration > Step 5. Remote > Step 6. Serial Form |

Port A: HD Multi-Input

⦿ XAVC — Input: HD with 1x (fps) Only, 2 Input Ports per 1 Board
○ Avid DNxHD(R) — Input: HD with 1x (fps) Only, 2 Input Ports per 1 Board Port B: HD Multi-Input ⦿ XAVC — Input: HD with 1x (fps) Only, 2 Input Ports per 1 Board
○ Avid DNxHD(R) — Input: HD with 1x (fps) Only, 2 Input Ports per 1 Board Port C: HD Multi-Input ⦿ XAVC — Input: HD with 1x (fps) Only, 2 Input Ports per 1 Board
○ Avid DNxHD(R) — Input: HD with 1x (fps) Only, 2 Input Ports per 1 Board Port D: HD Multi-Output ⦿ XAVC — Output: HD Only, 2 Output Ports per 1 Board
○ Avid DNxHD(R) — Output: HD Only, 2 Output Ports per 1 Board

[ Back ] [ Next ] [ Cancel ]

FIG.8

Port A-1 + Port A-2: Input: HD with 1x (fps) Only, 2 Input Ports per 1 Board

| XAVC | HD: 1280 x 720 YPbPr 4:2:2 10bit Class 100 | HD: 1920 x 1080 YPbPr 4:2:2 10bit Class 100 | 2K: 2048 x 1080 YPbPr 4:2:2 10bit Class 100 | QFHD: 3840 x 2160 YPbPr 4:2:2 10bit Class 300 | 4K: 4096 x 2160 YPbPr 4:2:2 10bit Class 300 |
|---|---|---|---|---|---|
| 59.94i | | ◯ | | | |
| 29.97PsF | | ◯ | ◯ | | |
| 29.97p | | ◯ | ◯ | | |
| 59.94p | ◯ | ● | | | |

Next: 59.94p HD: 1920 x 1080 YPbPr 4:2:2 10bit XAVC Class 100

SDI Type for Cable  ◯ HD-SDI  ◯ 3G-SDI (Level A)  ◯ 3G-SDI (Level B)

SDI Type for QFHD/4K  ◯ Square Division  ◯ 2-Sample Interleave Division

SDI Type for 2x mode  ◯ Aligning with Horseshoe-shape Field  ◯ Aligning with Field Monitor Out  ● 59.94p to 59.94i & HD-SDI  ◯ 59.94p & 3G-SDI (Level A)  ◯ 59.94p & 3G-SDI (Level B)

Sub Recording  ● Off  ◯ Using Internal Signal  ◯ Using External Interface

Sub Recording Configuration  [ Unusable Configuration ▼ ]

VIDEO SERVER, VIDEO SERVER SYSTEM, AND COMMAND PROCESSING METHOD

CROSS REFERENCE TO RELATED APPLICATIONS

This application is a U.S. National Phase of International Patent Application No. PCT/JP2016/001814 filed on Mar. 29, 2016, which claims priority benefit of Japanese Patent Application No. JP 2015-080782 filed Apr. 10, 2015. Each of the above-referenced applications is hereby incorporated herein by reference in its entirety.

BACKGROUND

The present technology relates to a video server, a video server system, and a command processing method that record and reproduce material data items such as images and sounds in a broadcast station.

Generally, in order to transmit or deliver image signals in a broadcast station system, and further in order to synchronize recording and reproduction of image signals in a data accumulation apparatus, clock and frame timing is extracted from the image signals to generate a reference synchronous signal, or a synchronous signal is received from outside, and the synchronous signal is fed to an apparatus. In addition, in a case where a command for a recording and reproduction control of the image signals is issued from a superior application system to a data accumulation apparatus via a LAN, the command issued via the LAN is received by a synchronous system control execution apparatus that generates the reference synchronous signal, and the synchronous system control execution apparatus controls the data accumulation apparatus at an appropriate timing based on the reference synchronous signal. Such technology is known (for example, see Japanese Patent Application Laid-open No. 2003-153207).

SUMMARY

However, the video server and the video server system in the broadcast station still have problems to be solved.

The present technology is made in view of the above-mentioned circumstances, and it is an object of the present technology to provide a video server, a video server system, and a command processing method having further improved performance.

In order to solve the problems, a video server according to the present technology includes a plurality of ports used for inputting and outputting material data items, a storage unit capable of storing group information about grouping of the plurality of ports, and a control unit that receives a command of designating a specific port of the plurality of ports for inputting and outputting one of a plurality of specific material data items and the other of the plurality of specific material data items as a first port, determines one or more other ports belonging to the same group of the first port as one or more second ports on the basis of the group information, and executes the command so as to synchronize the plurality of material data items each other using the first port and the one or more second ports.

The video server may further includes a communication interface that receives the command transmitted via an asynchronous communication network from a controller of a user.

The control unit may be configured to execute a command for the plurality of material data items with reference to a reference synchronous signal.

The control unit may be configured to feed a GUI (Graphical User Interface) for setting the group information to the controller of the user to be displayed, acquire setting information of the user about the displayed GUI for setting from the controller, and store the setting information in the storing unit.

The GUI for setting the group information may be configured to make the user set input/output attributes of each of the ports, to make the user set the group information about each of the ports to which the input attribute is set, and to make the user set the group information about each of the ports to which the output attribute is set.

A video server system according to the present technology includes a plurality of ports used for inputting and outputting material data items, a storage unit capable of storing group information about grouping of the plurality of ports, and a control unit that receives a command of designating a specific port of the plurality of ports for inputting and outputting one of a plurality of specific material data items and the other of the plurality of specific material data items as a first port, determines one or more other ports belonging to the same group of the first port as one or more second ports on the basis of the group information, and executes the command so as to synchronize the plurality of material data items each other using the first port and the one or more second ports, and a controller that transmits the command to the video server.

A command processing method the present technology by a control unit of a video server includes storing group information about grouping of a plurality of ports used for inputting and outputting material data items in a storage unit, receiving a command of designating a specific port of the plurality of ports for inputting and outputting one of a plurality of specific material data items and the other of the plurality of specific material data items as a first port, determining one or more other ports belonging to the same group of the first port as one or more second ports on the basis of the group information, and executing the command so as to synchronize the plurality of material data items each other using the first port and the one or more second ports.

Advantageous Effects of Invention

As described above, performance of a video server can be improved according to the present technology.

Note that effects described herein are not limited only to be illustrative, there may be effects other than those described herein.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 6 is a diagram showing a setting window of a system frequency (field period) in a port setting GUI;

FIG. 7 is a diagram showing a port input/output setting window in the port setting GUI;

FIG. 8 is a diagram showing a port Codec setting window in the port setting GUI;

FIG. 9 is a diagram showing a port detail setting in the port setting GUI;

FIG. 10 is a diagram showing a gang setting window in the port setting GUI;

FIG. 11 is a diagram showing an example of the gang setting in the port setting GUI;

FIG. 12 is a diagram showing another example of the gang setting in the port setting GUI.

DETAILED DESCRIPTION OF EMBODIMENTS

Hereinafter, an embodiment of the present disclosure will be described with reference to the drawings.

[Live System]

Figure 1:
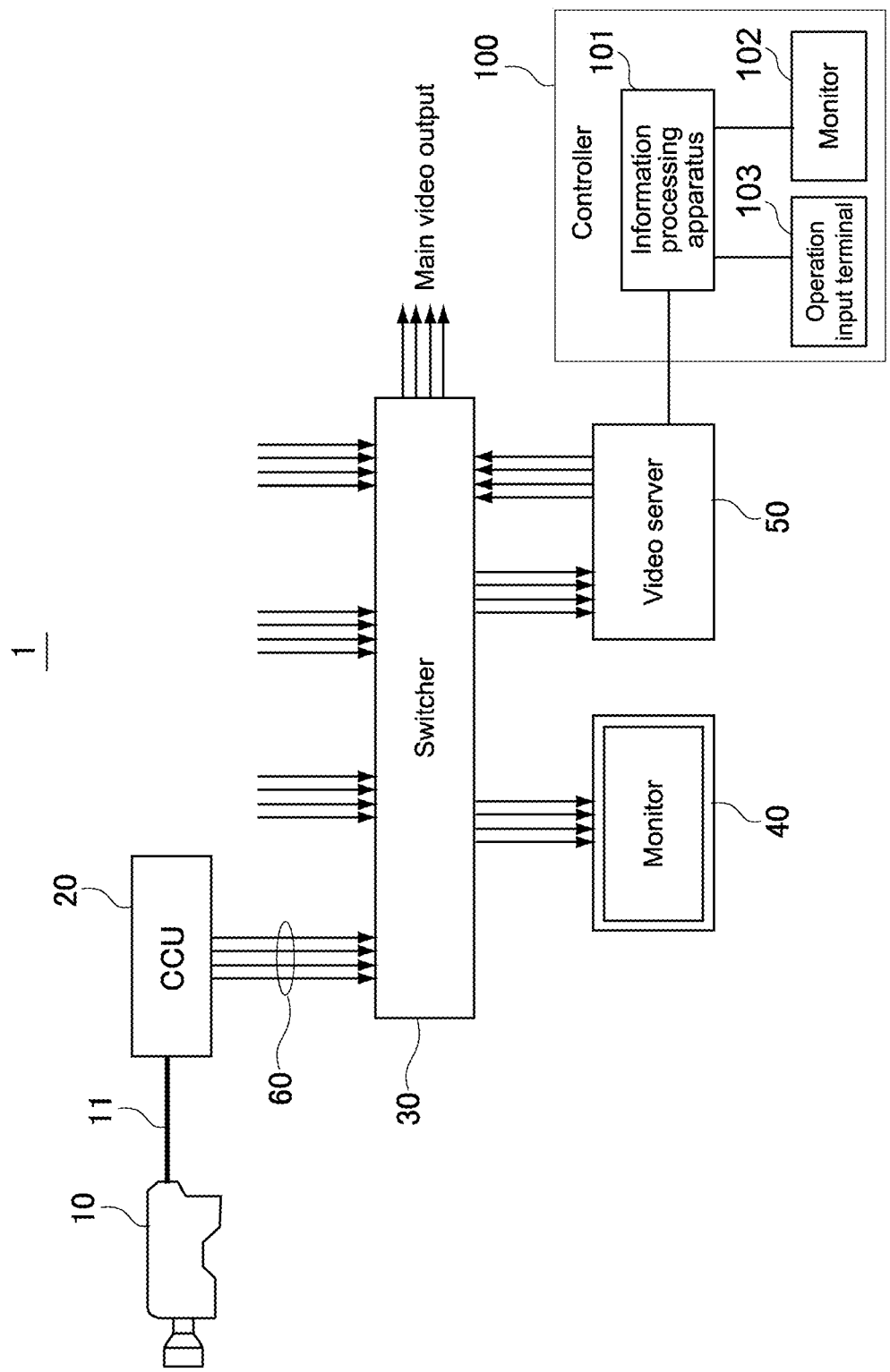
FIG. 1 is a diagram showing a configuration of a live system 1 using a video server 50 of a first embodiment according to the present technology.

FIG. 1 is a diagram showing a configuration of a live system 1 using a video server 50 of a first embodiment according to the present technology.

The live system 1 includes a camera 10, a CCU (Camera Control Unit) 20, a switcher 30, a monitor 40, a video server 50, and the like.

The camera 10 is, for example, an HD camera, a 4K camera, or the like. Image and sound signals obtained by the camera 10 are transmitted to the CCU 20 via a camera cable 11.

The CCU 20 receives the image signals and the sound signals transmitted from the camera 10, and performs a variety of control such as a variety of processing on the signals and adjustment of the camera 10. The CCU 20 generates image data items and sound data items in specific formats (hereinafter these data items are referred to as "material data items") from the image signals and the sound signals transmitted from the camera 10, and transmits the material data items to the switcher 30 via a serial interface 60 such as HD-SDI and 3G-SDI, for example.

The switcher 30 is a device that makes a route of the material data items transmitted from the CCU 20 to the monitor 40, the video server 50, a program output, or the like, for example, or makes a route of the material data items reproduced (Played) by the video server 50 to the monitor 40, the program output, or the like. The switcher 30 can change the route in synchronization with a reference synchronous signal/vertical synchronous signal (Genlock) of equipment.

The monitor 40 is a monitor that can display HD images, 4K images, or the like.

The video server 50 is an apparatus that can record the material data items as a file, and reproduce the material data items. A controller 100 is connected to the video server 50. The controller 100 can issue a variety of commands about recording and reproduction of the material data items to the video server 50 via an asynchronous communication network such as a TCP/IP network. The video server 50 and the controller 100 constitute a video server system. Also, the video server can transmit the file of the material data items, which the video server holds, to other devices via a network, or conversely receive a file of the material data items and hold the received file.

The controller 100 includes an information processing apparatus 101 such as a personal computer, for example, capable of asynchronously communicating with the video server 50, a monitor 102, and an operation input terminal 103. The operation input terminal 103 is a device that can accept inputs of a variety of commands about recording and reproduction of the material data items from the user, and is connectable to the information processing apparatus 101 via an interface such as a USB (Universal Serial Bus), for example.

(Operation Input Terminal 103)

Figure 13:
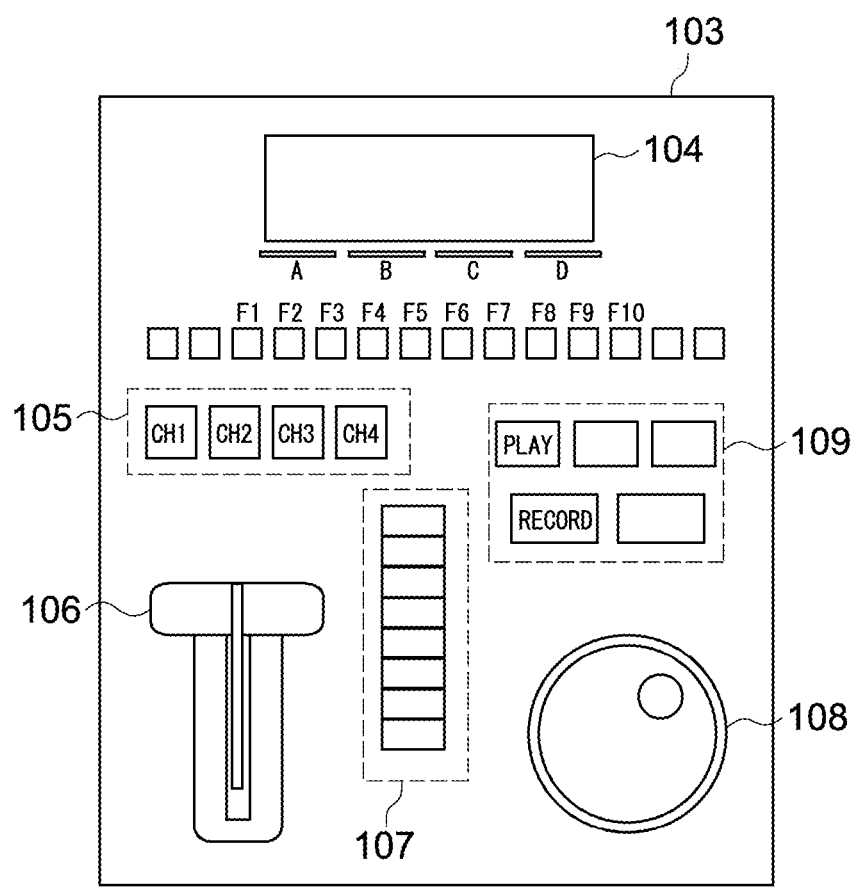
FIG. 13 is a diagram showing a configuration example of an operation panel of an operation input terminal 103.

FIG. 13 is a diagram showing a configuration example of an operation panel of the operation input terminal 103.

The operation input terminal 103 includes a display 104 that displays a time code or the like, a button set 105 that is used to select the port to be controlled, a lever 106 that is used to control a reproduction speed, a button group 107 that is used to perform an operation about editing such as setting an In point or the like, a jog shuttle dial 108, and a command input button group 109 that accepts a command input such as a record command and a reproduction command.

The operation input terminal 103 further includes a CPU, a memory, an interface such as a USB, and the like. The CPU is configured to transmit the accepted command input from the user by using the command input button group 109, the lever 106, the jog shuttle dial 108, or the like to the information processing apparatus 101 by using the interface. The information processing apparatus 101 generates a command to be transmitted to the video server 50 on the basis of the command input received from the operation input terminal 103, and transmits the command to the video server 50 via the asynchronous communication network such as the TCP/IP network.

[Configuration of Video Server 50]

Figure 2:
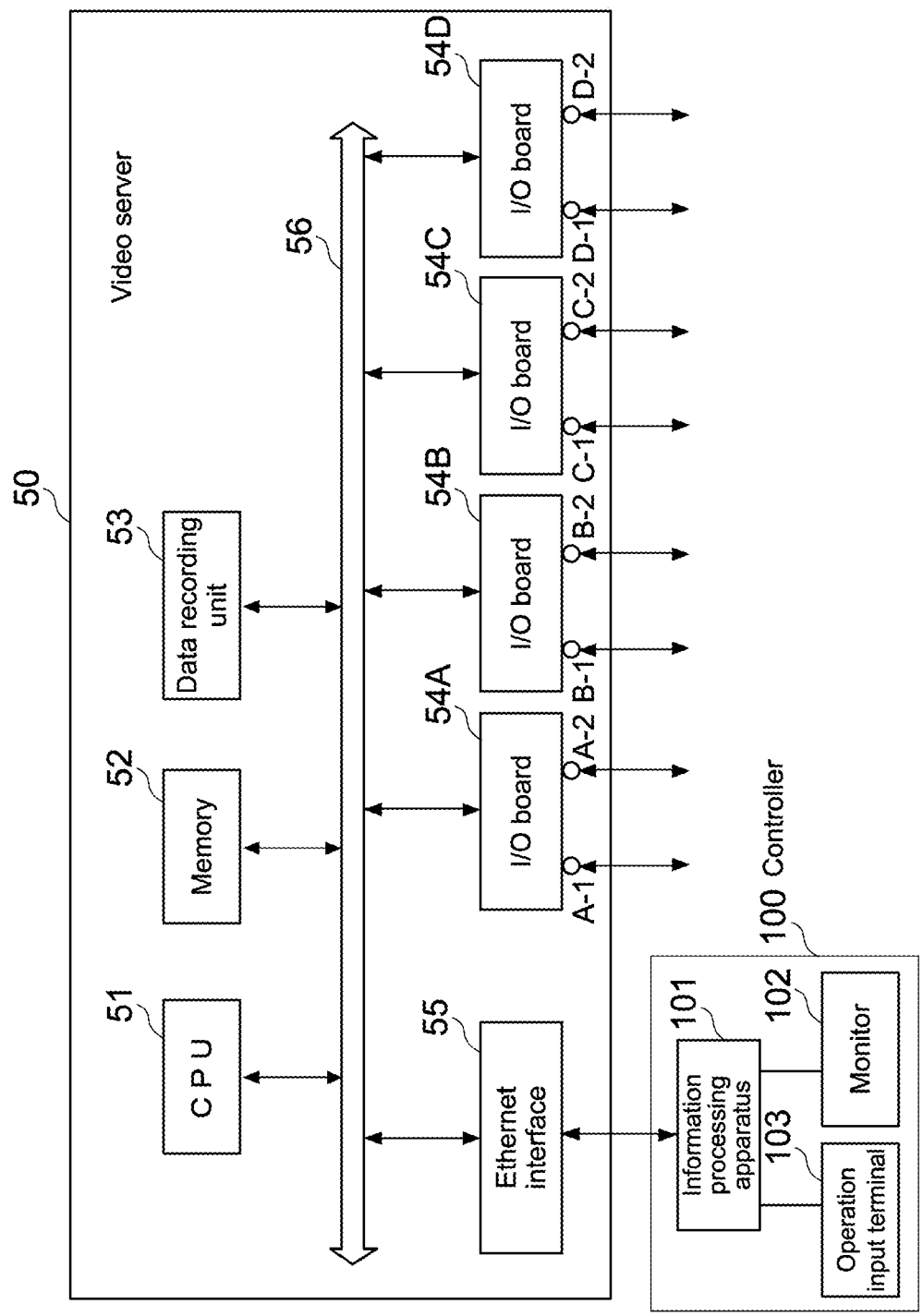
FIG. 2 is a block diagram showing a configuration of the video server 50.

FIG. 2 is a block diagram showing a configuration of the video server 50.

The video server 50 includes a CPU (Central Processing Unit) 51, a memory 52, a data recording unit 53, I/O boards 54A, 54B, 54C, and 54D, the Ethernet (registered trademark) interface 55, and a system bus 56.

The CPU 51 executes application programs stored in the memory 52, and performs a variety of arithmetic processing and control of each module. The CPU 51 corresponds to a "control unit" in the claims.

The memory 52 includes a RAM (Random Access Memory) or the like, and stores the application programs executed by the CPU 51 and a variety of data. Also, the memory 52 is used as a buffer area, for example, for transmission and reception of the material data items, and the like. Further, the memory 52 also stores group information for setting a group of ports used for a command gang function as described later, and the like. Accordingly, the memory 52 corresponds to a "storage unit" in the claims.

Note that an internal bus is one system bus 56 in FIG. 2, but the internal bus may include buses locally connecting the respective units.

The data recording unit 53 includes a storage medium such as a memory circuit and a memory card that stores the material data items as a file, and a reader/writer unit that reads/writes the material data items from/in the storage medium. The storage medium has a large capacity, for example, about 2T to 8T bytes.

The Ethernet (registered trademark) interface 55 is an interface for communicating with the controller 100. The controller 100 transmits a variety of commands about recording and reproduction of the material data items for the data recording unit 53 to the video server 50 via an asynchronous communication network such as a TCP/IP network.

The I/O boards 54A, 54B, 54C, and 54D are printed circuit boards having ports for inputting and outputting the material data items. The video server 50 includes the four I/O boards 54A, 54B, 54C, and 54D. Each of the I/O boards 54A, 54B, 54C, and 54D has two ports. Specifically, the I/O board 54A has a port A-1 and a port A-2. The I/O boards 54B has a port B-1 and a port B-2. The I/O board 54C has a port C-1 and a port C-2. The I/O board 54D has a port D-1 and a port D-2. Each of the ports A-1, A-2, B-1, B-2, C-1, C-2, D-1, and D-2 is connectable, for example, to the switcher 30 or the like via a serial interface cable such as HD-SDI and 3G-SDI, for example.

[Typical Method of Feeding Command to Video Server 50]

One typical method of feeding a command to the video server 50 is a method of controlling with commands from a dedicated controller connected to the video server 50 via serial communication cables (RS-422: Recommended Standard 422). According to this method, two commands such as a recording command and a reproduction command can be simultaneously fed from the dedicated controller to the video server 50 by using two serial cables.

Figure 3:
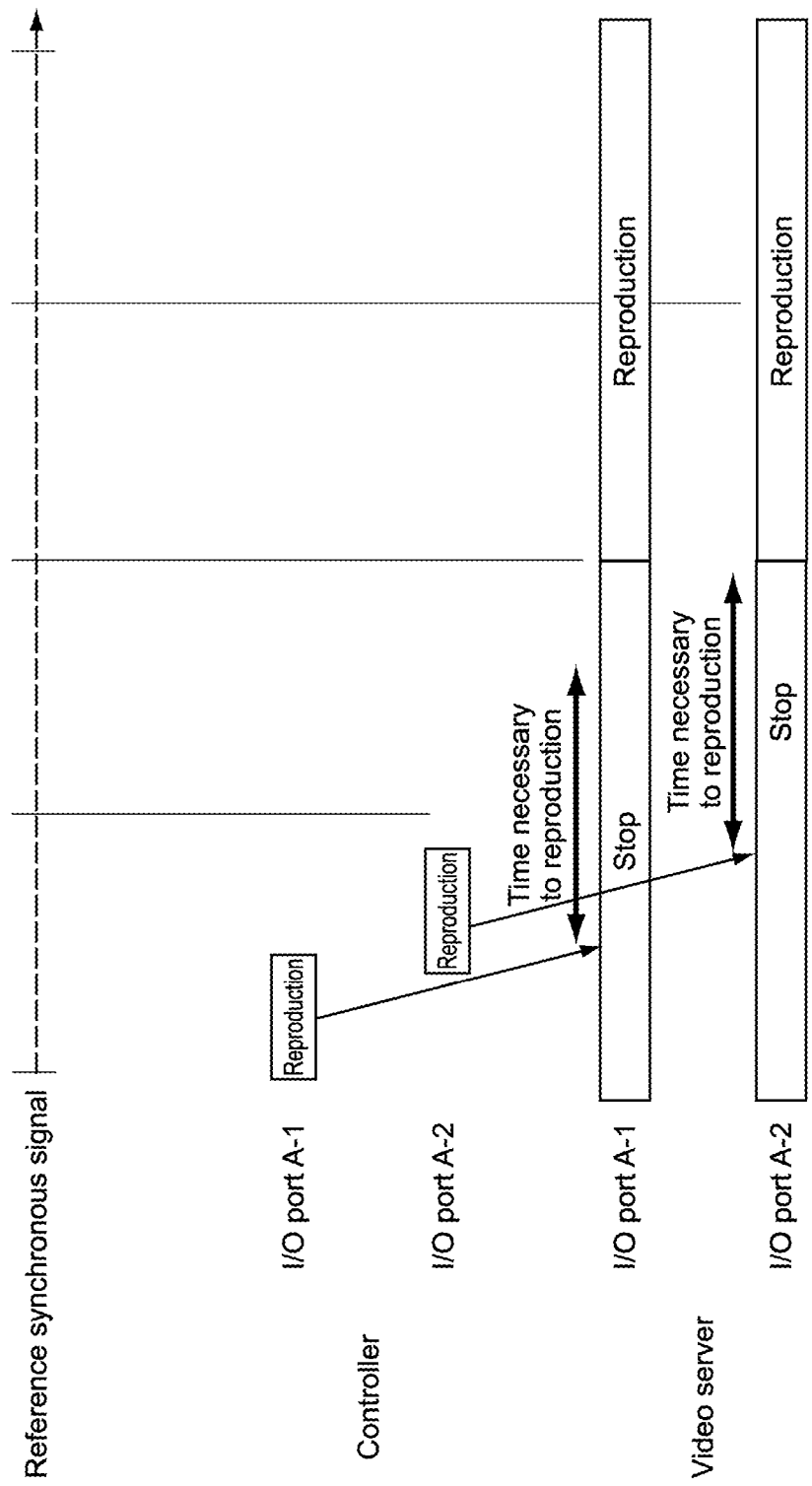
FIG. 3 is a timing chart of an operation in a case where reproduction commands for two material data items are issued from a dedicated controller to the video server 50 by means of serial communication.

FIG. 3 is a timing chart of an operation in a case where reproduction commands for two material data items are issued from the dedicated controller to the video server 50 by means of serial communication.

Here, the reproduction commands for the two material data items are issued from the dedicated controller to the video server 50 by using the two serial communication cables with the intension of simultaneously reproducing the two material data items, e.g., reproducing multi-angle images or the like. The serial communication of the RS-422 or the like allows the communication that ensures a temporal restriction in relation to reception and delivery of commands between apparatuses. Therefore, as shown in FIG. 3, by transmitting commands one by one from the dedicated controller, which is receiving a reference synchronous signal, to the video server 50 by using the two serial communication cables, the two commands are issued to the video server 50 within one cycle of the reference synchronous signal. As a result, the two material data items recorded in the video server 50 can be synchronously reproduced each other on the basis of the reference synchronous signal.

[Gang Function of Command]

In contrast, as in this embodiment, in a case where the video server 50 is connected to the controller 100 that issues the commands on the video server 50 via the TCP/IP network, a time from sending the commands from the controller 100 to the TCP/IP network to reaching at the video server 50 is not guaranteed due to properties of the TCP/IP protocol.

Figure 4:
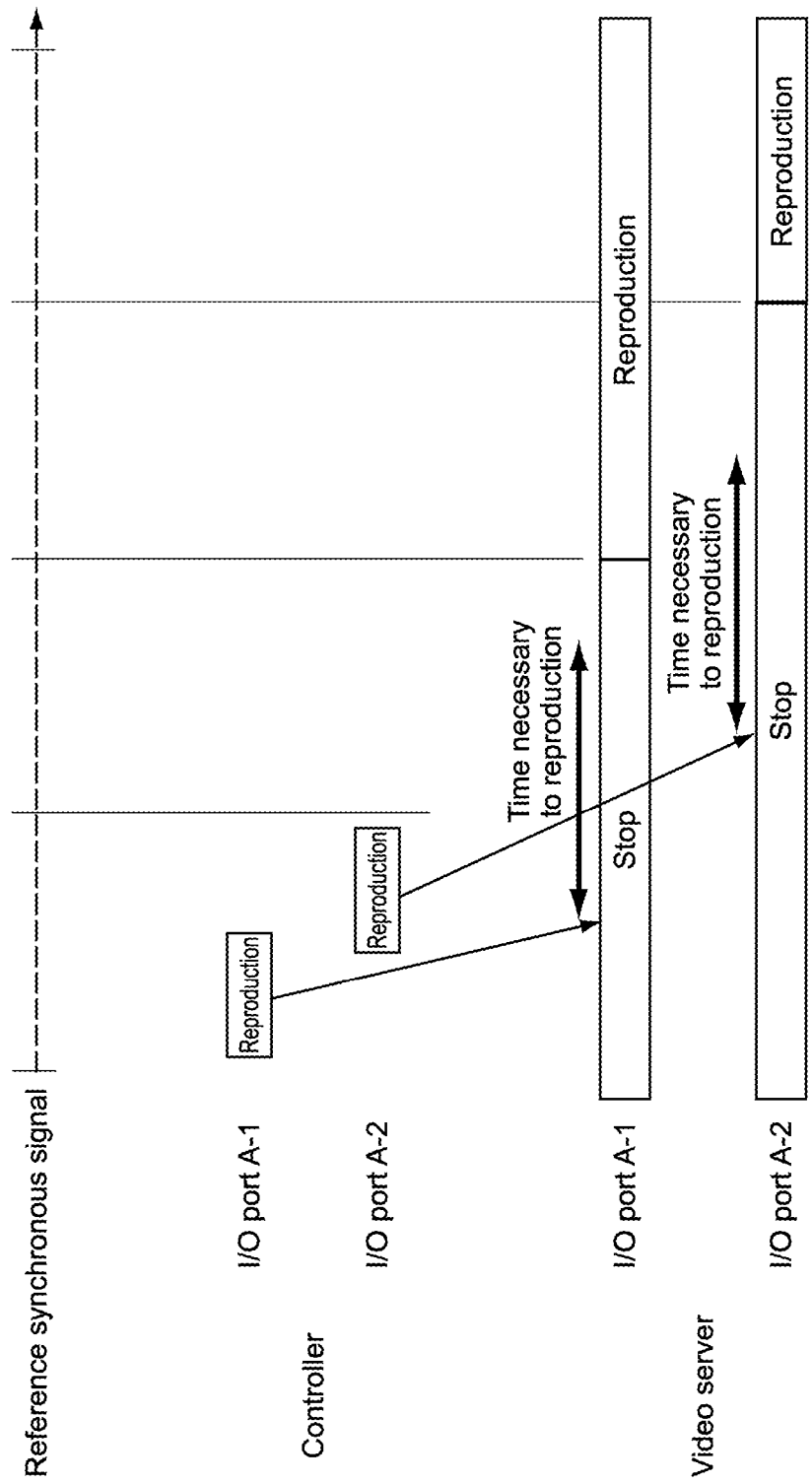
FIG. 4 is a timing chart of an operation in a case where two reproduction commands are issued from a controller 100 to the video server 50 via a TCP/IP network.

FIG. 4 is a timing chart of an operation in a case where two reproduction commands are issued from the controller 100 to the video server 50 via the TCP/IP network. As shown in FIG. 4, a time to reach the commands transmitted from the controller 100 to the TCP/IP network to the video server 50 is changed from moment to moment due to the status of the TCP/IP network or the like. Accordingly, there is no guarantee that the plurality of commands transmitted from the controller 100 to the TCP/IP network reach the video server 50 in one cycle of the reference synchronous signal. In a case where a plurality of commands reach the video server 50 across a plurality of cycles of the reference synchronous signal, a plurality of material data items including, for example, multi-angle images or the like are reproduced with a temporal deviation.

Thus, the video server 50 according to the embodiment has a command gang function. The command gang function is as follows. The video server 50 sets a plurality of ports as a group. When the video server 50 receives a command of designating a port (first port) to be controlled from the controller 100, the video server 50 executes, in synchronization with each other, a command using the port designated by the received command and a command using one or more other ports (second ports) in the group, to which the designated port belongs.

In the command gang function, group information about the ports is produced in advance. The group information about the ports at least includes the information indicating that which ones of the plurality of ports belong to the same group. One or more groups are set. For example, in a case where eight ports are present, up to four groups to which at least two ports belong can be set. The group information about the ports are set by the user and is stored in the memory 52 or the like.

[Operation Example Using Gang Function]

Next, an operation example using the gang function of the video server 50 will be described.

Here, an operation that the plurality of material data items already stored in the video server 50 are reproduced and output will be described.

To simultaneously reproduce and output the plurality of material data items from the video server 50, the user of the controller 100 designates the plurality of material data items and one port, which are to be controlled, and inputs an instruction of reproduction. Here, one of the plurality of material data items is designated as a material data item to be controlled 1, and the other is designated as a material data item to be controlled 2. The material data item to be controlled 1 is linked to the designated port. The input of the instruction by the user is performed by using the operation input terminal 103 connected to the information processing apparatus 101.

According to an alternative designation method, the user of the controller 100 may first designate the material data items for respective of the plurality of ports belonging to a group, and may next input the instruction of reproduction to the first port of the group.

The information processing apparatus 101 generates a command to be issued to the video server 50 in accordance with an operation input from the operation input terminal 103, and sequentially transmits the commands to the video server 50 via the TCP/IP network.

The video server 50 receives the command transmitted from the controller 100 via the TCP/IP network by means of the Ethernet (registered trademark) interface 55. The CPU 51 of the video server 50 instructs the reproduction of two material data items designated by the command (or a command of designating the material data items) to data recording unit 53, and discerns other ports belonging to the same group as the port designated by the command (or a command of instructing the reproduction to the first port) from the group information.

Here, it is assumed that the material data item designated as the material data item to be controlled 1 by the user is a "material data item "a"", and the material data item designated as the material data item to be controlled 2 is a "material data item "b"", and the "port A-1" is designated by the user as the port. Also, it is assumed that the "port A-1" and the "port A-2" belong to the same group as to the group information.

Figure 5:
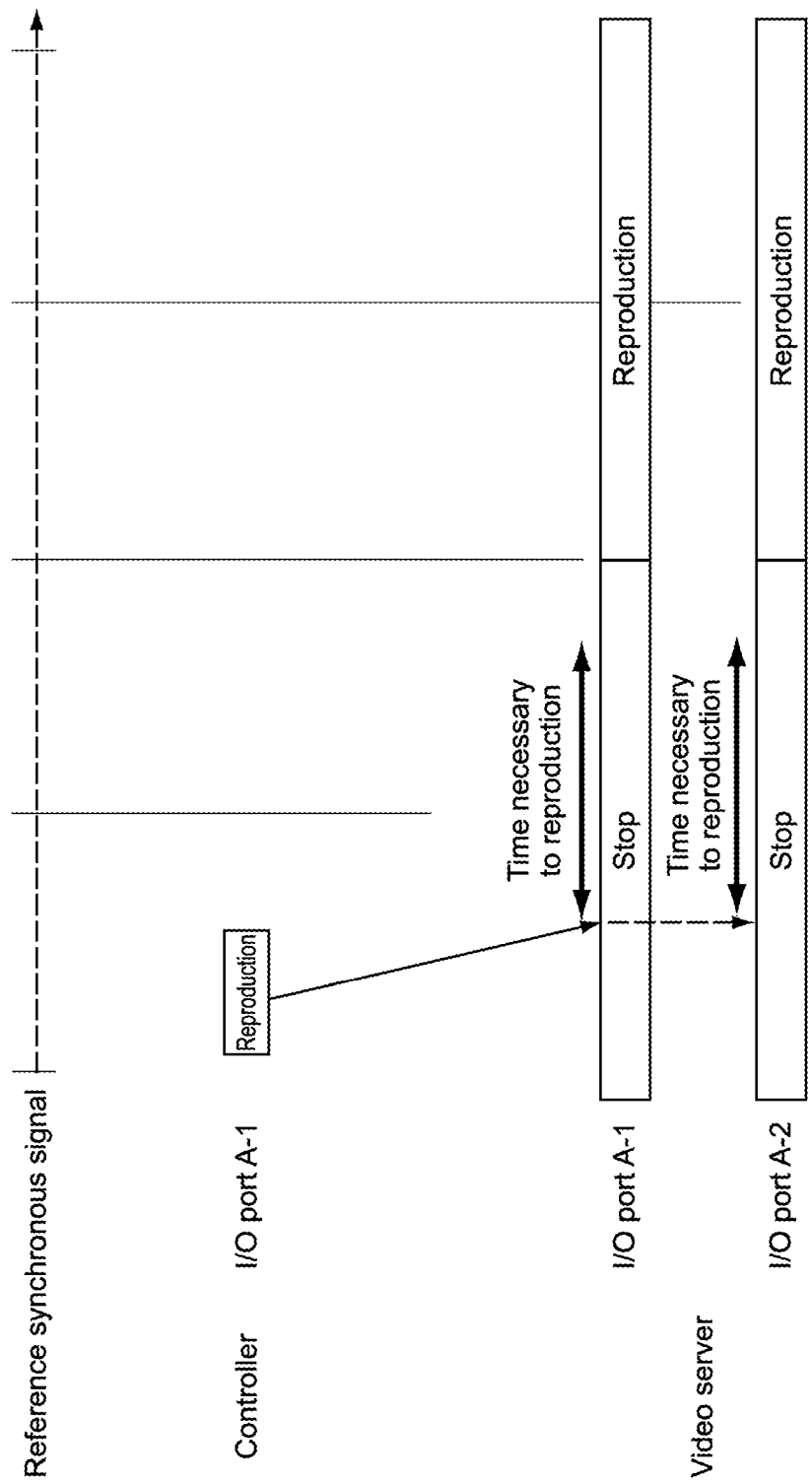
FIG. 5 is a timing chart of an operation in a case where two commands are executed by using a gang function of the video server 50.

FIG. 5 is a timing chart of an operation in a case where the reproduction command of the two material data items "a" and "b" is issued from the controller 100 to the video server 50 via the TCP/IP network, and the video server 50 executes the two commands by using the gang function.

The CPU 51 of the video server 50 performs a control so as to output the material data item "a" read out from the data recording unit 53 using the port A-1. Also, the CPU 51 of the video server 50 performs a control so as to output the material data item "b" read out from the data recording unit 53 using another port A-2 belonging to the same group as the port A-1. At this time, the CPU 51 performs a control so as to synchronize the material data item "a" and the material data item "b" each other and to simultaneously start reproduction and output (Playout) by using the port A-1 and the port A-2 on the basis of the reference synchronous signal.

Thus, according to the command gang function, only by issuing one command from the controller 100 to the video server 50, a plurality of commands in relation to recording and reproduction of the material data items are synchronously reproduced each other in the video server 50. In other words, even in a connection environment where the commands are issued from the controller 100 to the video server 50 by means of an asynchronous communication such as the TCP/IP network, the video server 50 can synchronously execute the plurality of commands in relation recording and reproduction of the material data items.

The commands to be processed by using the gang function includes a recording start, a recording stop, a recording pause, or the like in relation to the recording. In addition, in relation to the reproduction, the commands include a jog shuttle control such as a reproduction start, a reproduction stop, a pause, a fast forward, a rewind, a frame-by-frame advance, and queue-up (jump to the designated time). A variety of commands in relation to the reproduction are designated as appropriate and are switched as necessary by the user, e.g., in a case of searching the material data items for an important scene or event, for example. In this case, since the gang function ensures that the plurality of material data items are synchronously reproduced in response to the designated command, a burden on the user can be significantly reduced as compared with a typical method of designating the plurality of the same commands for each of the material data items.

Note that the plurality of material data items including, for example, multi-angle images or the like simultaneously reproduced by a variety of methods (a fast forward, a frame-by-frame advance, a slow replay, or the like) by using the command gang function may be simultaneously transmitted to the monitor 40 and a main video output by means of a multiple output function of the switcher 30 or the video server 50.

[Port Setting GUI]

Next, a port setting GUI will be described.

The CPU 51 of the video server 50 transmits a port setting GUI (Graphical User Interface) to the controller 100 via the TCP/IP network, and displays the GUI on the monitor 102 connected to the information processing apparatus 101 of the controller 100. The GUI is used to accept from user inputs of a variety of settings including settings for the above-mentioned group information for the eight ports in total mounted to the video server 50. The setting information input by the user in the port setting GUI displayed on the monitor 102 is transmitted to the video server 50 via the TCP/IP network. The CPU 51 of the video server 50 stores the received setting information (including the group information) in the memory 52.

Hereinafter, the port setting GUI will be described.

The port settings include the following phases.
1. System frequency (field period) setting
2. Port input/output setting
3. Port Codec setting
4. Port detail setting
5. Gang setting (1. System Frequency (Field Period) Setting)

FIG. 6 is a diagram showing a setting window of a system frequency (field period).

On the setting window, a user can set the system frequency (field period), i.e., the frequency of the reference synchronous signal. On the setting window, the user can select the frequency of the target reference synchronous signal by using radio buttons. When the user operates the Next button on the setting window, it switches to the next window of the port input/output setting.

(2. Port Input/Output Setting)

FIG. 7 is a diagram showing a port input/output setting window.

On the setting window, the four I/O boards 54A, 54B, 54C, and 54D are set whether they are used for input or output.

The "Port A", "Port B", "Port C", and "Port D" on the setting window of FIG. 7 indicate the four I/O boards 54A, 54B, 54C, and 54D mounted to the video "Input", "Output", "HD Multi-Input", "HD Multi-Output", "Input with 2 Boards", and "HD Cut Out" indicate input/output setting values for the I/O boards 54A, 54B, 54C, and 54D.

The "Input" means that only one port of the I/O board is used and the port is used for a 4K image input or an HD video input.

The "Output" means that only one port of the I/O board is used and the port is used for a 4K image output or an HD video output.

The "HD Multi-Input" means that the two ports of the I/O board are used for the HD video input.

The "HD Multi-Output" means that two ports of the I/O board are used for the HD video output.

The "Input with 2 Boards" means that by gathering the plurality of ports of the two I/O boards, images are input at double speed in the frequency set in "1. system frequency (field period) setting" window in the case of the 4K, and images are input at 8 times speed at the maximum in the case of the HD.

The "HD Cut Out" means that only one port of the I/O board is used and the port is used for the HD video output where any parts are cut-out from the 4K image.

On the setting window of FIG. 7, a plurality of candidates of the input/output setting values assigned in a variety of combinations of the "Input", the "Output", the "HD Multi-Input", the "HD Multi-Output", the "Input with 2 Boards", the "HD Cut Out", and the like for the I/O boards 54A, 54B, 54C, and 54D are displayed. The user can select one of the candidates by using the radio buttons or the like.

Here, it is assumed that the "6-IN 2-Out" is selected by the user. The "6-IN 2-Out" means that the three I/O boards 54A, 54B, and 54C are set to the "HD Multi-Input" and the remaining one, i.e., the I/O board 54D, is set to the "HD Multi-Output".

When the user operates the Next button on the setting window, it switches to the next window of the Codec setting. At this time, when the user operates the Back button, it returns to the former window of the system frequency (field period) setting. Also, it is possible to operate the Cancel button to redo the port input/output setting.

(3. Port Codec Setting)

FIG. 8 is a diagram showing the port Codec setting window.

On the setting window, the user can individually set the type of the Codec (recording format) for each of the I/O boards 54A, 54B, 54C, and 54D. When the user operates the Next button on the setting window, it switches to the next window of the Port detail setting.

(4. Port Detail Setting)

FIG. 9 is a diagram showing the port detail setting, in particular, by taking the detail setting of the I/O board 54A. On the port detail setting window, the user can set the details of the recording format for each of the I/O boards 54A, 54B, 54C, and 54D, for example, such as a resolution, a frame frequency, and a color space. When the user operates the Next button on the setting window, it switches to the next gang setting.

(5. Gang Setting)

Figure 10:
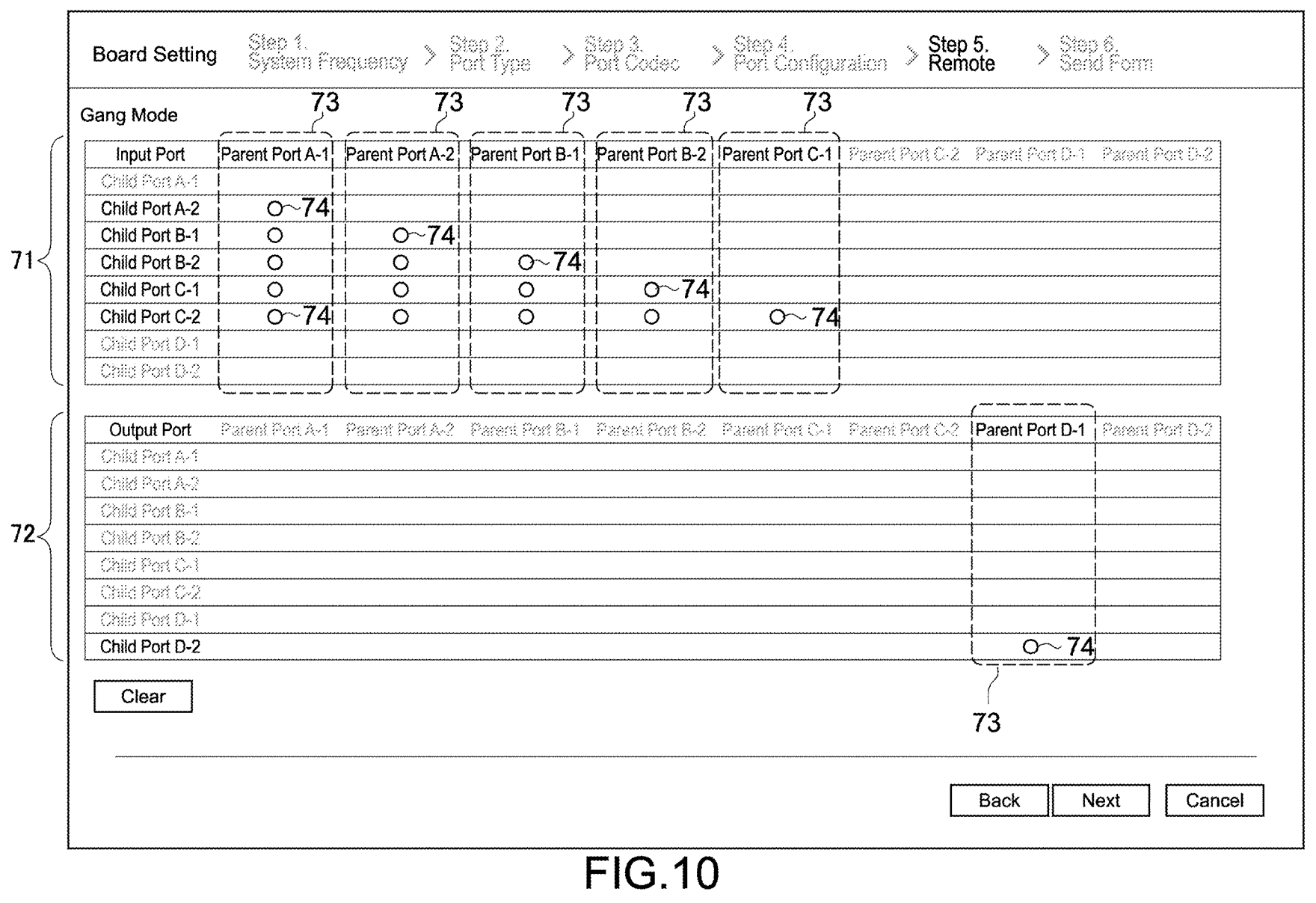

FIG. 10 is a diagram showing the gang setting window.

The user can select the two ports to be valid on a gang setting window shown in FIG. 10.

The gang setting window is created according to setting content of "2. Port input/output setting" described above. As described above, in a case where "6-IN 2-Out" is selected on the port input/output setting window, three I/O boards 54A, 54B, and 54C are set to "HD Multi-Input", and the remaining one, i.e., I/O board 54D is set to "HD Multi-Output". In this case, the two ports of the I/O board 54A (port number: Port A-1, Port A-2), the two ports of the I/O board 54B (port number: Port B-1, Port B-2), the two ports of the I/O board 54C (port number: Port C-1, Port C-2) are set as the ports for input, and the two ports of the I/O board 54D (port number: Port D-1, Port D-2) are set as the ports for output.

The gang setting window has a gang setting area 71 of the input ports and a gang setting area 72 of the output ports. The gang setting area 71 of the input ports is for the user to select a group/combination (set) of the input ports to be gang-set. The gang setting area 72 of the output ports is for the user to select a group/combination (set) of the output ports to be gang-set.

In the gang setting area 71 of the input ports, the respective port numbers of all the I/O boards 54A, 54B, 54C, and 54D are arranged and displayed horizontally and vertically. Note that the word "Parent" of the port number, e.g., "Parent Port A-1" and the word "Child" of the port number, e.g., "Child Port A-2" are attached to the respective port numbers as a matter of convenience that the port numbers are set to an operation subject "Parent" and a subordinate "Child".

Note that the operation subject is "Parent" as a matter of convenience as described above, but it is possible to operate the port of "Child".

The gang setting area 71 of the input ports includes check buttons 74 for a unit 73 of one "Parent" port number and one or more "Child" port numbers that can be combined therewith. The check buttons 74 are for selecting a one-to-one combination of the port number ("Parent" port number) in a row and the port number ("Child" port number) in a column by the user. For example, the gang setting area 71 of the input ports includes the check buttons 74 for the unit 73 of the combinations of the "Parent Port A-1" in the row and the "Child Port A-2", the "Child Port B-1", the "Child Port B-2", the "Child Port C-1", and the "Child Port C-2" in the column. The user can select one or more "Child" port numbers that are combined with the "Parent Port A-1" in the row by an input operation using the check button 74.

Note that active-displayed port numbers and inactive-displayed port numbers are mixed on the gang setting window in order to identify selectable port numbers and unselectable port numbers by the user in the gang setting. As the respective port numbers of all the I/O boards 54A, 54B, 54C, and 54D are displayed in the row and column, one port number is exclusively active-displayed. In addition, the port numbers that are not set as the group are active-displayed, and the port numbers that are set as the group are inactive-displayed. Furthermore, the gang setting area 71 of the input ports is a setting area for the input ports, and only the port numbers set as the input ports are active-displayed on the gang setting window in a non-set status.

On the other hand, a configuration of the gang setting area 72 of the output ports is same as the configuration of the gang setting area 71 of the input ports except that only the port numbers set as the output ports are active-displayed on the gang setting window in the non-set status. In this example, since only the two ports (port numbers: Port D-1 and Port D-2) of the I/O board 54D are set as the ports for output, the input operation by the user using the check button 74 determines only whether or not the ports are set as a pair for the gang setting.

Figure 11:
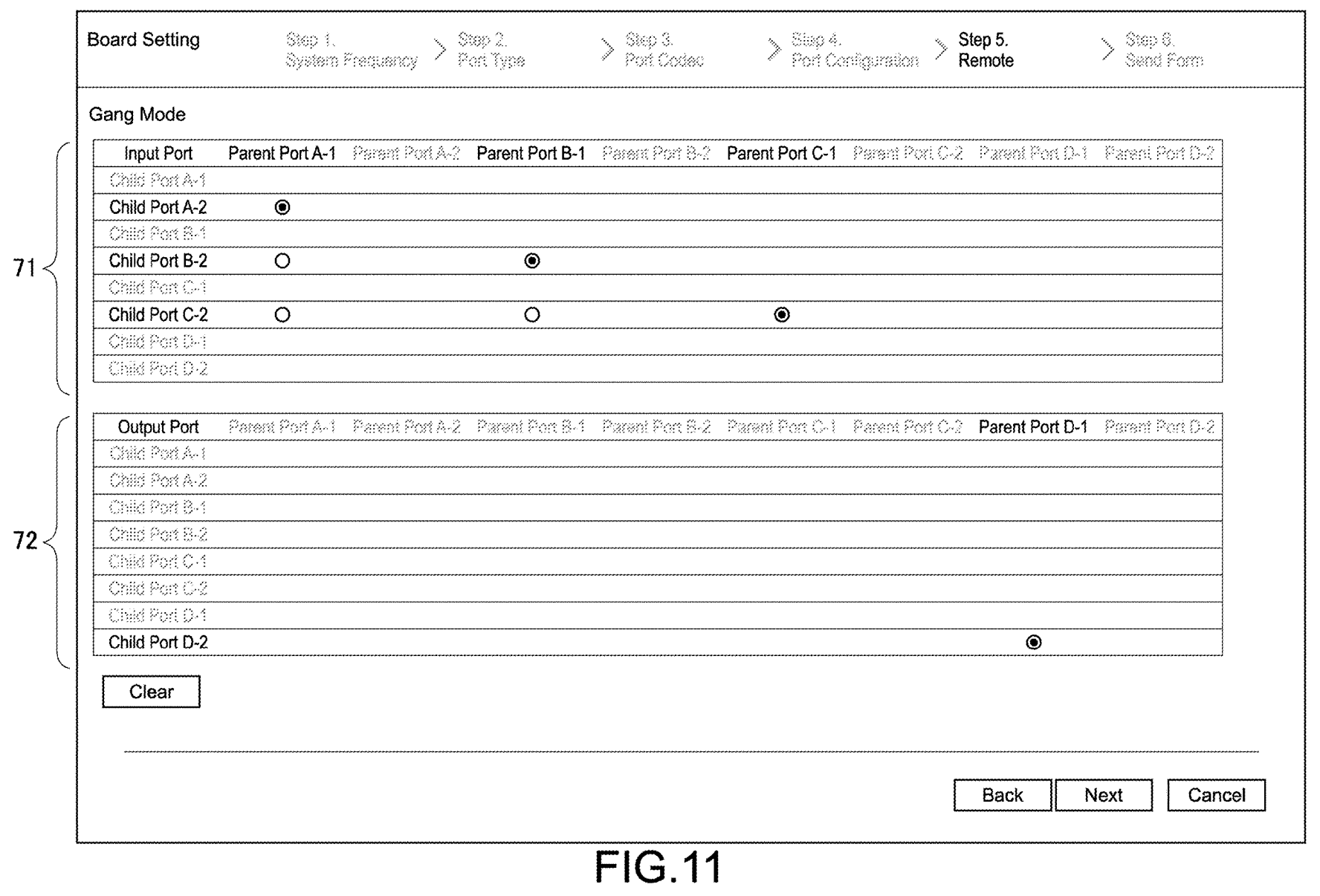

FIG. 11 is a diagram showing an example of the gang setting.

This example shows the case that a pair of "Parent Port A-1" and "Child Port A-2", a pair of "Child Port B-1" and "Child Port B-2", and a pair of "Child Port C-1" and "Child Port C-2" are set as the gang setting for input. Also, a pair of "Parent Port D-1" and "Child Port D-2" is set as the gang setting for output.

Figure 12:
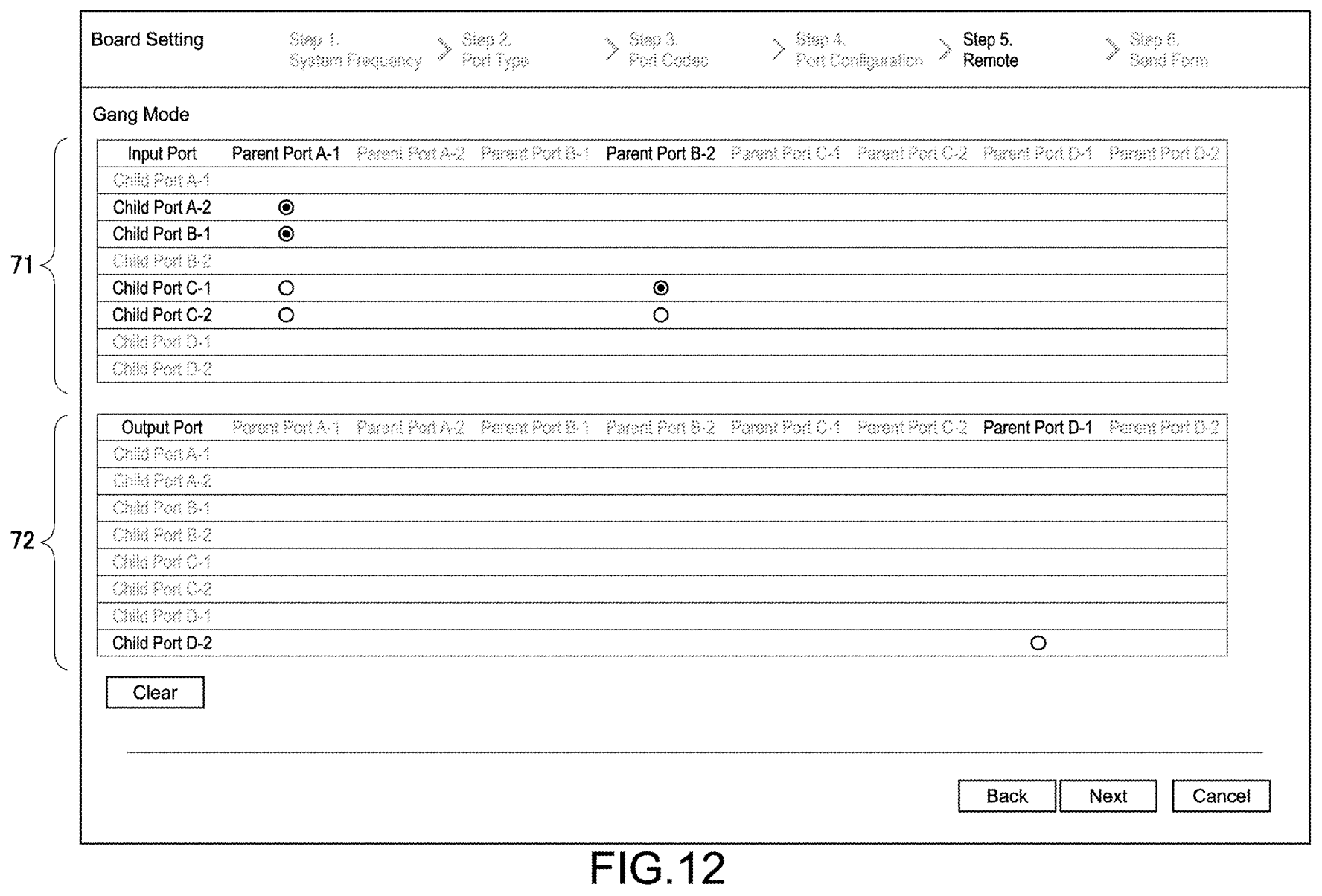

FIG. 12 is a diagram showing another example of the gang setting.

This example shows that the case that three ports, "Parent Port A-1", "Child Port A-2", and "Child Port B-1" are set as the group as the gang setting for input. Thus, three ports can be set as one group in the gang setting. Similarly, four or more ports may be set as a group.

By operating the Next button on the gang setting window, it switches to a next setting content confirmation window. By operating an end button or the like on the setting content confirmation window, the group information is stored in the memory 52 or the like of the video server 50.

By using the port setting GUI, the user can easily perform the gang setting on two or more ports.

Note that a communication connection between the controller and the video server is not limited to the network, and may be, for example, through a USB. Using the USB, in a case where the reference synchronous signal is not fed to the controller and the controller does not have the reference synchronous signal, two material data items can be effectively synchronously reproduced and so on.

The present technology may also have the following configurations.

(1) A video server, including:

a plurality of ports used for inputting and outputting material data items;

a storage unit capable of storing group information about grouping of the plurality of ports; and a control unit that receives a command of designating a specific port of the plurality of ports for inputting and outputting one of a plurality of specific material data items and the other of the plurality of specific material data items as a first port, determines one or more other ports belonging to the same group of the first port as one or more second ports on the basis of the group information, and executes the command so as to synchronize the plurality of material data items each other using the first port and the one or more second ports.

(2) The video server according to (1), further including:
a communication interface that receives the command transmitted via an asynchronous communication network from a controller of a user.

The video server according to (1) or (2), in which
the control unit is configured to execute a command for the plurality of material data items with reference to a reference synchronous signal.

(4) The video server according to any of (1) to (3), in which
the control unit is configured to feed a GUI (Graphical User Interface) for setting the group information to the controller of the user to be displayed, acquire setting information of the user about the displayed GUI for setting from the controller, and store the setting information in the storing unit.

(5) The video server according to (4), in which
the GUI for setting the group information is configured to make the user set input/output attributes of each of the ports, to make the user set the group information about each of the ports to which the input attribute is set, and to make the user set the group information about each of the ports to which the output attribute is set.

It should be understood by those skilled in the art that various modifications, combinations, sub-combinations and alterations may occur depending on design requirements and other factors insofar as they are within the scope of the appended claims or the equivalents thereof.

What is claimed is:

1. A video server, comprising:
a plurality of ports that inputs and outputs a plurality of material data items;
a storage unit that stores group information, wherein the group information includes information of categorization of the plurality of ports into a plurality of groups; and
a control unit that:
transmits a graphical user interface (GUI) to a user controller, wherein
the GUI is transmitted for display on a monitor communicatively coupled with the user controller, and
the user controller receives a user input via the GUI to acquire setting information for the group information;
receives an instruction that designates a specific material data item of a plurality of specific material data items for each group of ports of the plurality of groups;
receives a command that designates, as a first port, a specific port of the plurality of ports to input and output a first material data item of the plurality of specific material data items and material data items of the plurality of specific material data items other than the first material data item, wherein the first port belongs to a specific group of the plurality of groups;
determines, as at least one second port, at least one port of the plurality of ports other than the first port based on the setting information for the group information, wherein the at least one port belongs to the specific group; and
controls the first port and the at least one second port that belong to the specific group based on the designation of the specific material data item of the plurality of specific material data items, wherein the first port and the at least one second port synchronize the plurality of specific material data items and concurrently output the plurality of specific material data items through the first port and the at least one second port.

2. The video server according to claim 1, further comprising a communication interface that receives the command transmitted via an asynchronous communication network from the user controller.

3. The video server according to claim 2, wherein
the control unit further executes the command for the plurality of specific material data items with reference to a reference synchronous signal.

4. The video server according to claim 3, wherein
the control unit further acquires the setting information for the group information from the user controller, and the storage unit further stores the setting information.

5. The video server according to claim 4, wherein
the user controller further receives the user input to:
set input attributes and output attributes of each of the plurality of ports;
set the group information associated with each of the plurality of ports to which an input attribute of the input attributes is set; and
set the group information associated with each of the plurality of ports to which an output attribute of the output attributes is set.

6. The video server according to claim 3, wherein the user controller receives the user input via the GUI to acquire codec settings of the plurality of ports.

7. The video server according to claim 3, wherein the user controller receives the user input via the GUI to acquire a frequency of the reference synchronous signal.

8. The video server according to claim 3, wherein
the user controller receives the user input via the GUI to acquire port detail settings of each port of the plurality of ports, and the port detail settings includes a recording format, a frame frequency, and a color space.

9. A video server system, comprising:
a video server including:
a plurality of ports that inputs and outputs a plurality of material data items;
a storage unit that stores group information, wherein the group information includes information of categorization of the plurality of ports into a plurality of groups; and
a control unit that:
transmits a graphical user interface (GUI) to a user controller, wherein
the GUI is transmitted for display on a monitor communicatively coupled with the user controller, and
the user controller receives a user input via the GUI to acquire setting information for the group information;
receives an instruction that designates a specific material data item of a plurality of specific material data items for each group of ports of the plurality of groups;
receives a command that designates, as a first port, a specific port of the plurality of ports to input and output a first material data item of the plurality of specific material data items and material data items of the plurality of specific material data items other than the first material data item, wherein the first port belongs to a specific group of the plurality of groups;

determines, as at least one second port, at least one port of the plurality of ports other than the first port based on the setting information of the group information, wherein the at least one port belongs to the specific group; and controls the first port and the at least one second port that belong to the specific group based on the designation of the specific material data item of the plurality of specific material data items, wherein the first port and the at least one second port synchronize the plurality of specific material data items and concurrently output the plurality of specific material data items through the first port and the at least one second port; and the user controller that transmits the command to the video server.

10. A command processing method, comprising:

in a video server that comprises a control unit and a storage unit:

storing, in the storage unit, group information, wherein the group information includes information of categorization of a plurality of ports into a plurality of groups;

transmitting a graphical user interface (GUI) to a user controller, wherein the GUI is transmitted for display on a monitor communicatively coupled with the user controller, and the user controller receives a user input via the GUI to acquire setting information for the group information;

receiving an instruction that designates a specific material data item of a plurality of specific material data items for each group of ports of the plurality of groups;

receiving a command of designating, as a first port, a specific port of the plurality of ports for inputting and outputting a first material data item of the plurality of specific material data items and material data items of the plurality of specific material data items other than the first material data item, wherein the first port belongs to a specific group of the plurality of groups;

determining, as at least one second port, at least one port of the plurality of ports other than the first port based on the setting information of the group information, wherein the at least one port belongs to the specific group; and controlling the first port and the at least one second port that belong to the specific group based on the designation of the specific material data item of the plurality of specific material data items, wherein the first port and the at least one second port synchronize the plurality of specific material data items and concurrently output the plurality of specific material data items through the first port and the at least one second port.

* * * * *